(12) United States Patent
Lewandowski et al.

(10) Patent No.: US 8,733,737 B2
(45) Date of Patent: May 27, 2014

(54) NOSE SEAL FOR SURGE RELIEF VALVES

(75) Inventors: Mark Lewandowski, Tomball, TX (US); Raj Shah, Houston, TX (US); Phi Nguyen, Tomball, TX (US)

(73) Assignee: SPX Corporation, Charlotte, NC (US)

( * ) Notice: Subject to any disclaimer, the term of this patent is extended or adjusted under 35 U.S.C. 154(b) by 291 days.

(21) Appl. No.: 13/105,189

(22) Filed: May 11, 2011

(65) Prior Publication Data

US 2012/0285551 A1 Nov. 15, 2012

(51) Int. Cl.

| F16K 1/48 | (2006.01) |
|---|---|
| F16K 1/12 | (2006.01) |
| F16K 15/00 | (2006.01) |
| F16K 21/04 | (2006.01) |
| F16J 15/02 | (2006.01) |

(52) U.S. Cl.
USPC ....... 251/357; 137/220; 137/516.27; 277/644

(58) Field of Classification Search
USPC ........ 137/220, 516.25–516.29, 536; 251/356, 251/357; 277/500, 586–589, 630, 637, 644
See application file for complete search history.

(56) References Cited

U.S. PATENT DOCUMENTS

| 801,708 | A | * | 10/1905 | Bowes | 251/88 |
|---|---|---|---|---|---|
| 1,665,394 | A | * | 4/1928 | Willoughby | 137/614.11 |
| 1,710,635 | A | * | 4/1929 | Wertz | 137/543.19 |
| 1,721,114 | A | * | 7/1929 | Hampton et al. | 137/516.29 |
| 2,213,998 | A | * | 9/1940 | Sifkovitz | 137/242 |
| 2,260,381 | A | * | 10/1941 | Kennon | 137/516.29 |
| 2,329,576 | A | * | 9/1943 | Anderson | 137/516.29 |
| 2,593,740 | A | * | 4/1952 | Faust | 251/357 |
| 3,438,391 | A | * | 4/1969 | Yocum | 137/516.29 |
| 4,008,733 | A | * | 2/1977 | Courant et al. | 137/220 |
| 4,860,995 | A | * | 8/1989 | Rogers | 251/356 |
| 6,189,894 | B1 | * | 2/2001 | Wheeler | 277/549 |
| 7,168,440 | B1 | * | 1/2007 | Blume | 137/15.18 |

* cited by examiner

*Primary Examiner* — John K Fristoe, Jr.
*Assistant Examiner* — Michael R Reid
(74) *Attorney, Agent, or Firm* — Baker & Hostetler LLP

(57) ABSTRACT

In accordance with one embodiment of the present invention, a seal for a surge relief valve includes a) a valve housing having a flow inlet and a flow outlet; b) an annular retainer for coupling a plug to an interior of the valve housing, the retainer having a first end oriented toward the flow inlet and a second end remote therefrom; c) the plug having a first end oriented toward the flow inlet and a second end remote therefrom, the plug having a mating junction for coupling with the second end of the retainer, the plug having a first countersink, a second countersink, a first lip defined between the first and second countersinks and a second lip adjacent the second countersink; and d) an annular plug seal having a first end oriented toward the flow inlet and a second end remote from the first end for mating with the second countersink and a lip that abuts the second end of the retainer.

12 Claims, 8 Drawing Sheets

NOSE SEAL FOR SURGE RELIEF VALVES

FIELD OF THE INVENTION

The present invention relates generally to seals for industrial fluid flow applications. More particularly, the present invention relates to seals for surge relief valves.

BACKGROUND OF THE INVENTION

Oil and gas pipelines are extremely important for delivery of oil and gas from the source to the consumer. Such pipelines must accommodate large quantities of oil and gas, be able to withstand various pressures, and are at times, subject to surges of pressure. Pressure surges also known as pressure surge waves or "water hammers," are caused by various factors, such as, rapid opening or closure of a valve or starting or stopping of a pump. Thus, pipelines are equipped with surge relief valves to accommodate and handle pressure surges.

Surge relief valves must respond very quickly and smoothly to pressure surges. The surge relief valves must open quickly to track the large initial pressure rise and then close in direct response to pressure decrease at the valve inlet, relieving sufficient fluid volume to eliminate the surge. The excess fluid is typically diverted to a storage vessel and then returned to the product line.

It has been known to provide a dynamically balanced-plug assembly that slides back and forth easily and rapidly to open, close and throttle. Pressure in the plug cavity closes the valve while lack of pressure opens the valve. Typically, the cavity behind the valve plug is filled with nitrogen gas to affect proper relief set pressure of the valve and hold the valve's internal plug or piston, tight against its seat. This cavity loading force seats the valve and opposes the force generated by line pressure in front of the valve. The valve remains closed until the surge wave pressure exceeds the force behind the plug (set pressure). The surge relief valve then opens to track the surge.

Thus, the seals in the valves must be seated properly and provide a tight seal, preventing fluid flow leaks under both steady state conditions and surges. In order to properly function, it is advantageous for the mating surfaces within the valve to engage with a relatively high degree of precision without slippage or gaps.

Oftentimes, it is difficult to provide a seal that functions across a range of pressures and temperatures, is compatible with a variety of fluids, allows the valve to be opened and closed with minimal effort, and is sufficiently wear resistant to withstand repeated opening and closing operations. Accordingly, it is desirable to provide a seal for surge relief valves, and all valves in general, that can withstand high pressure applications, operate over long periods of time, and forms a tight seal that reduces or eliminates fluid leak around the seal.

SUMMARY OF THE INVENTION

The foregoing needs are met, to a great extent, by the present invention, which provides a seal for surge relief valves, and all valves in general, that can withstand high pressure applications, operate over long periods of time, and forms a tight seal that reduces or eliminates fluid leak around the seal.

In accordance with one embodiment of the present invention, a seal for a surge relief valve includes a) a valve housing having a flow inlet and a flow outlet; b) an annular retainer for coupling a plug to an interior of the valve housing, the retainer having a first end oriented toward the flow inlet and a second end remote therefrom; c) the plug having a first end oriented toward the flow inlet and a second end remote therefrom, the plug having a mating junction for coupling with the second end of the retainer, the plug having a counterbore, a groove, a first lip defined between the counterbore and groove and a second lip adjacent the groove; and d) an annular plug seal having a first end oriented toward the flow inlet and a second end remote from the first end for mating with the groove and a lip that abuts the second end of the retainer.

In accordance with another embodiment of the present invention, a seal for a valve includes a) a plug seal having an annular shape and a generally rectangular profile, comprising a top surface, a bottom surface remote from the top surface, an interior side and an exterior side remote from the interior side, the top surface having a protrusion, the exterior side having a frusto-conical lip, and a bump defined by a junction of the top surface and the interior side; and b) a plug for mating with the plug seal, the plug comprising a first lip with a slope, a second lip and a depression defined between the first and second lips, wherein the slope of the first lip mates with the bump of the plug seal, the depression of the plug mates with the bottom surface of the plug seal and the second lip mates with the frusto-conical lip of the plug seal.

In accordance with yet another embodiment of the present invention, a method for sealing a surge relief valve includes a) providing a plug seal having an annular shape and a generally rectangular profile, comprising a top surface, a bottom surface remote from the top surface, an interior side and an exterior side remote from the interior side, the top surface having a protrusion, the exterior side having a frusto-conical lip and a bump defined by a junction of the top surface and the interior side; b) mating with the plug seal, a plug having a generally cylindrical shape, a first end and a second end remote from the first end, the plug first end comprising a first lip with a slope, a second lip and a depression defined between the first and second lips, wherein the slope of the first lip mates with the bump of the plug seal, the depression mates with the bottom surface of the plug seal and the second lip mates with the frusto-conical lip of the plug seal; and c) mating with the plug seal a seal spacer, the seal spacer having an annular shape and a generally rectangular profile, comprising a top surface, a bottom surface remote from the top surface, the bottom surface having a depression formed therein for mating with the protrusion of the plug seal, the seal spacer having an interior surface and an exterior surface remote from the interior surface.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
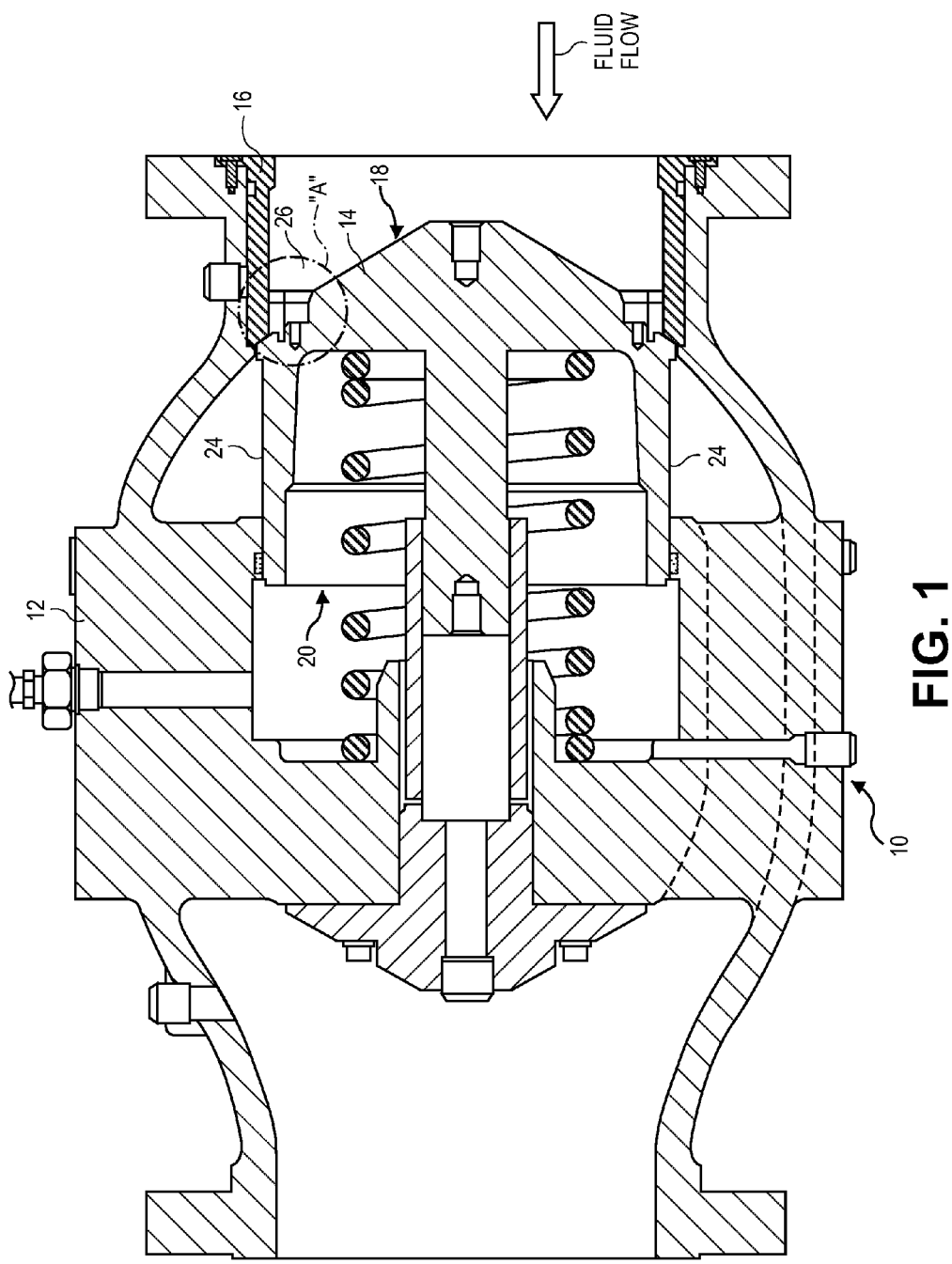
FIG. 1 is a cross sectional view illustrating a surge relief valve and its components according to a preferred embodiment of the present invention.

The invention will now be described with reference to the drawing figures, in which like reference numerals refer to like parts throughout. An embodiment in accordance with the present invention provides a seal for surge relief valves, and valves in general, that can withstand high pressure applications, operate over long periods of time, and form a tight seal that reduces or eliminates fluid leak around the seal.

FIG. 1 is a cross-sectional view of a surge relief valve in accordance with an embodiment of the present invention. The valve 10 includes a valve body 12, a plug 14 and a retainer 16 that maintains the plug 14 in place. The direction of fluid flow is indicated with an arrow as illustrated.

Figure 2:
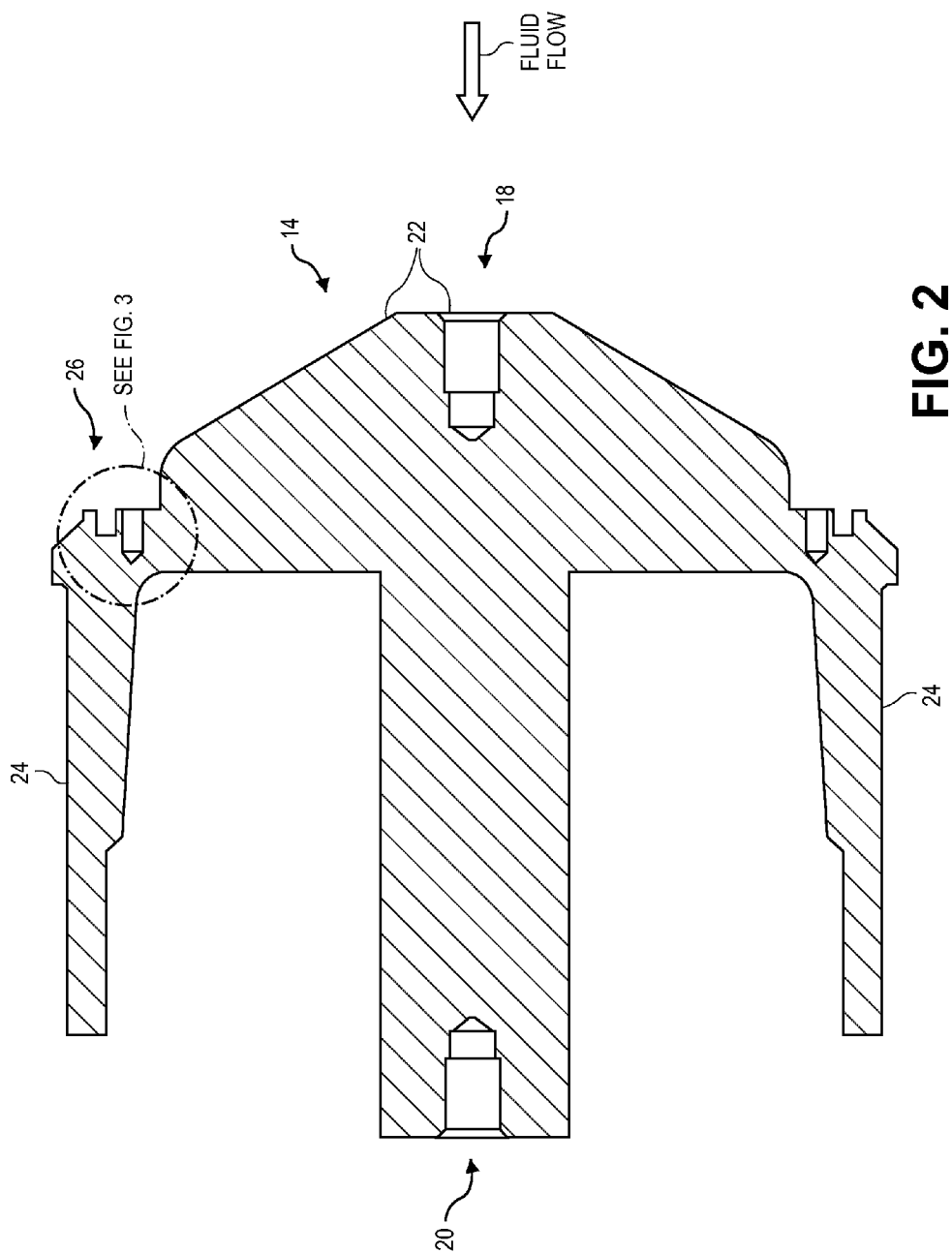
FIG. 2 is a cross sectional view of a plug of the surge relief valve depicted in FIG. 1.

FIG. 2 is a cross sectional view of the plug 14 of FIG. 1. The plug 14 has a first end 18 and a second end 20 remote therefrom. The first end 18 has a frusto-conical shape with a generally convex face 22 facing or oriented toward the direction of fluid flow. Further, the plug 14 has a generally cylindrical plug housing 24 disposed between the first and second ends 18, 20 respectively. A junction point 26 exists where the first end 18 meets the plug housing 24. The junction point 26 provides a location where the retainer 16 mates with the plug 14, as will be discussed in greater detail below. Although reference is made to "a" junction point 26, it is noted that the term "a" is made with reference only to the figures. Because the plug 14 is generally cylindrical and the retainer 16 is an annular structure, the junction point 26 refers to a profile location where the retainer 16 and plug 14 mate along their respective circumferential surfaces and is not a single point in actuality.

Figure 3:
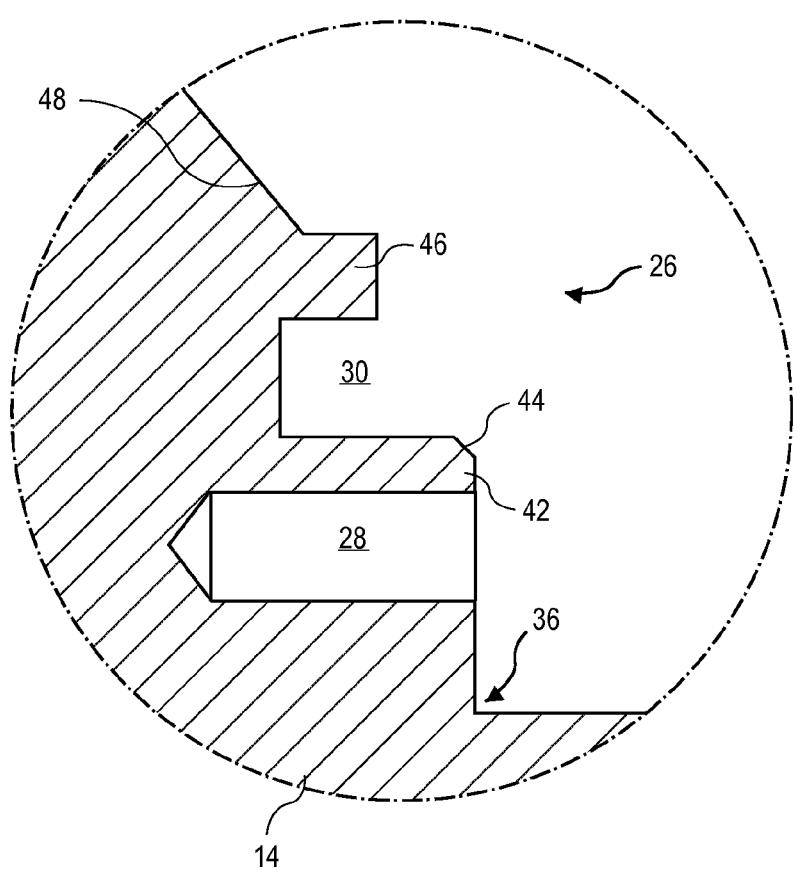
FIG. 3 is a detailed cross sectional view of a portion of the plug depicted in FIG. 2.
Figure 4:
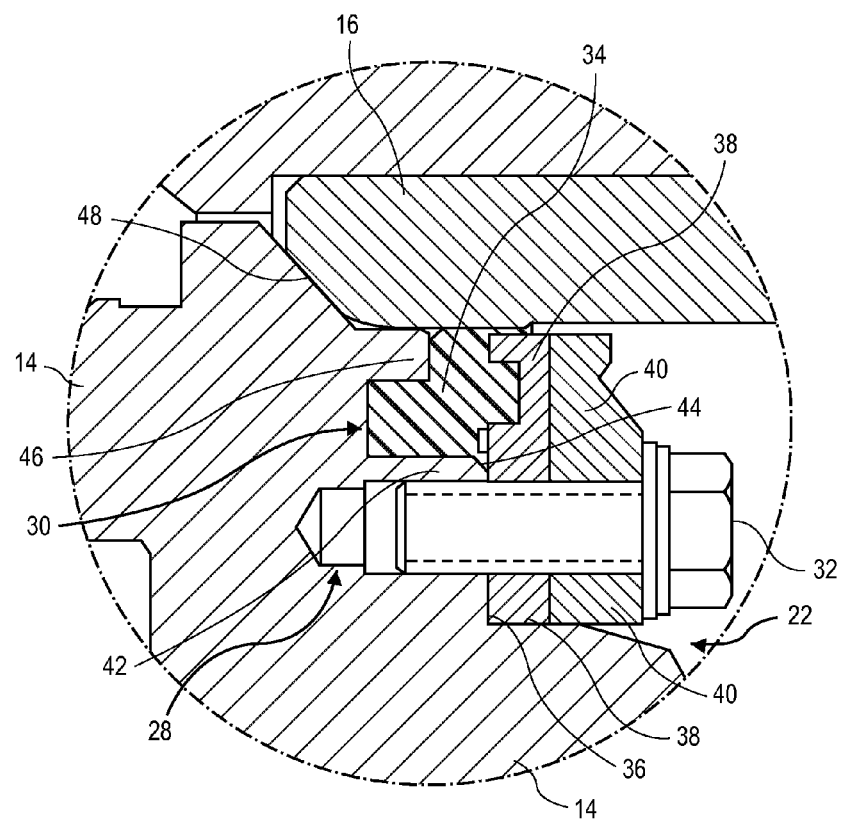
FIG. 4 is a detailed cross sectional view of the surge relief valve of FIG. 1.

FIGS. 3 and 4 are detailed views of the junction point 26 of FIG. 1. The junction point 26 includes various components that function to seal and retain the plug 14 within the valve 10 and prevent fluid from leaking from the valve 10. The plug 14 includes a counterbore 28 and a groove 30. The counterbore 28 is sized and configured to mate with a bolt 32. The groove 30 is sized and configured to mate with a plug seal 34. Between the counterbore 28 and the first end 18 is a seat 36 for mating with a seal spacer 38 and a seal retainer 40.

Defined between the counterbore 28 and groove 30 respectively, is a first lip 42 that has a first slope 44 angled toward the counterbore 28. Further, the plug 14 includes a second lip 46 that is configured to mate with both the plug seal 34 and the retainer 16. A second slope 48 is defined beyond the second lip 46 toward the housing 24 of the plug 14. This second slope 48 contacts the retainer 16 and is angled toward the first end 18.

Figure 5:
FIG. 5 is a cross sectional view of a seal retainer of the surge relief valve of FIG. 1.

FIG. 5 is a cross sectional view of the seal retainer 40 depicted in FIGS. 3 and 4. The seal retainer 40 is an annular structure and has a plurality of bores 50 disposed periodically through the seal retainer 40. The seal retainer bores 50 allow for the bolt 32 to pass through the bores 50 to fasten the seal retainer 40 to the plug 14.

Figure 6A:
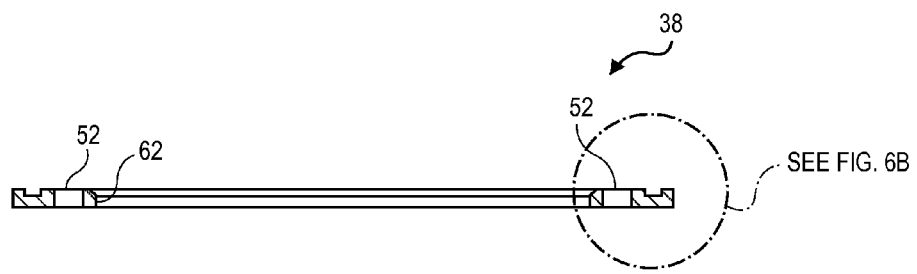
FIG. 6A is a cross sectional view of a seal spacer of the surge relief valve depicted in FIG. 1.

FIG. 6A is a cross sectional view of the seal spacer 38 according to an embodiment of the present invention. The seal spacer 38 is annular in geometry and has a plurality of bores 52 disposed about the seal spacer 38. The seal spacer bores 52 allow for the bolt 32 to pass through the bores 52, allowing the bolt 32 to fasten the seal retainer 40 and the seal spacer 38 to the plug 14.

Figure 6B:
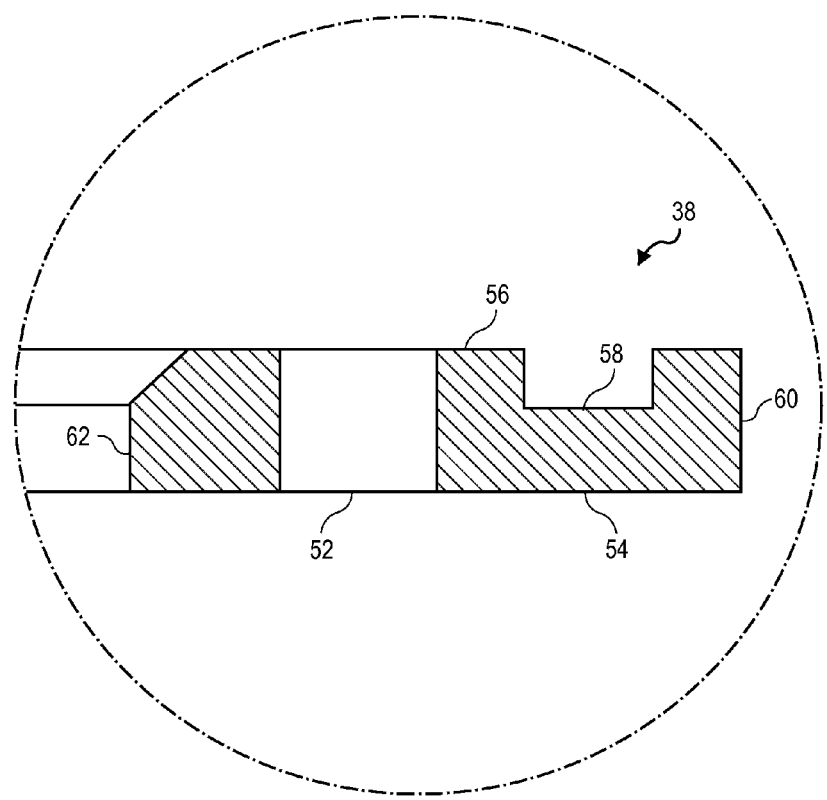
FIG. 6B is a detailed view of the seal spacer depicted in FIG. 6A.

FIG. 6B is a detailed profile view of the seal spacer 38. The seal spacer 38 has a first planar surface 54 that contacts the seal retainer 40. Further, the seal spacer 38 includes a second planar surface 56 remote from the first planar surface 54. The second planar surface 56 has a depression 58 for mating with the plug seal 34 as will be described below. Lastly, the seal spacer 38 has an exterior seal spacer wall 60 that contacts the retainer 16 and an interior seal spacer wall 62, remote from the exterior seal spacer wall 60, that contacts the seat 36 of the plug 14. Further, the interior seal spacer wall 62 includes a sloped surface positioned at an angle to the first end 18 for easily sliding the seal spacer into place.

Figure 7A:
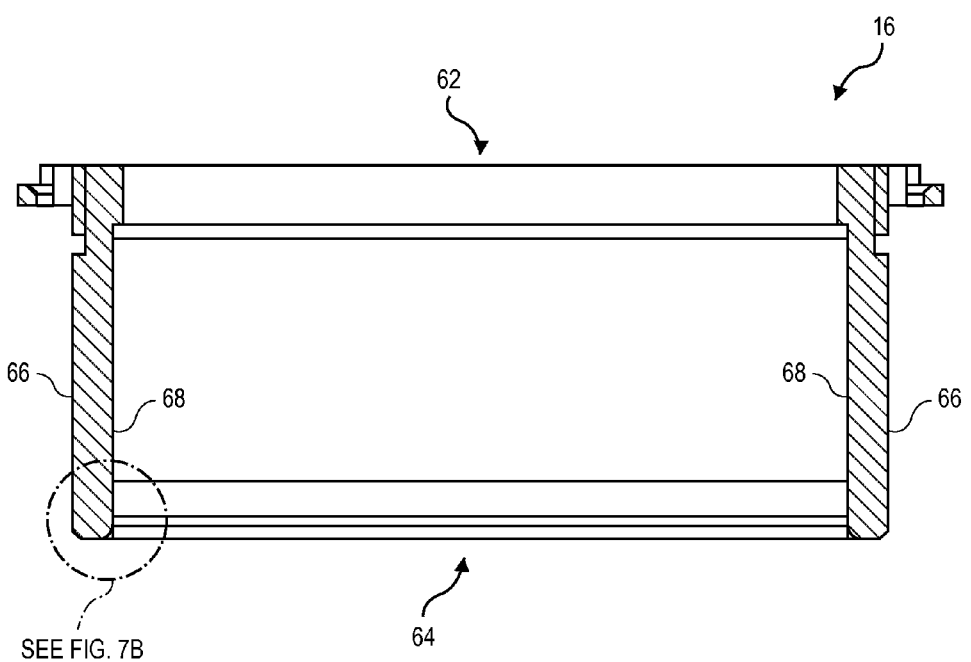
FIG. 7A is a cross sectional view of a retainer of the surge relief valve of FIG. 1.

FIG. 7A is a cross sectional view of the retainer 16, according to an embodiment of the present invention. The retainer 16 has an annular shape with a first end 62 facing or oriented toward the fluid flow and a second end 64 remote therefrom. Further, the retainer 16 has an exterior wall 66 and an interior wall 68. The interior wall 68 contacts the seal retainer 40, the seal spacer 38 and the plug seal 34 while the exterior wall contacts the valve body 12.

Figure 7B:
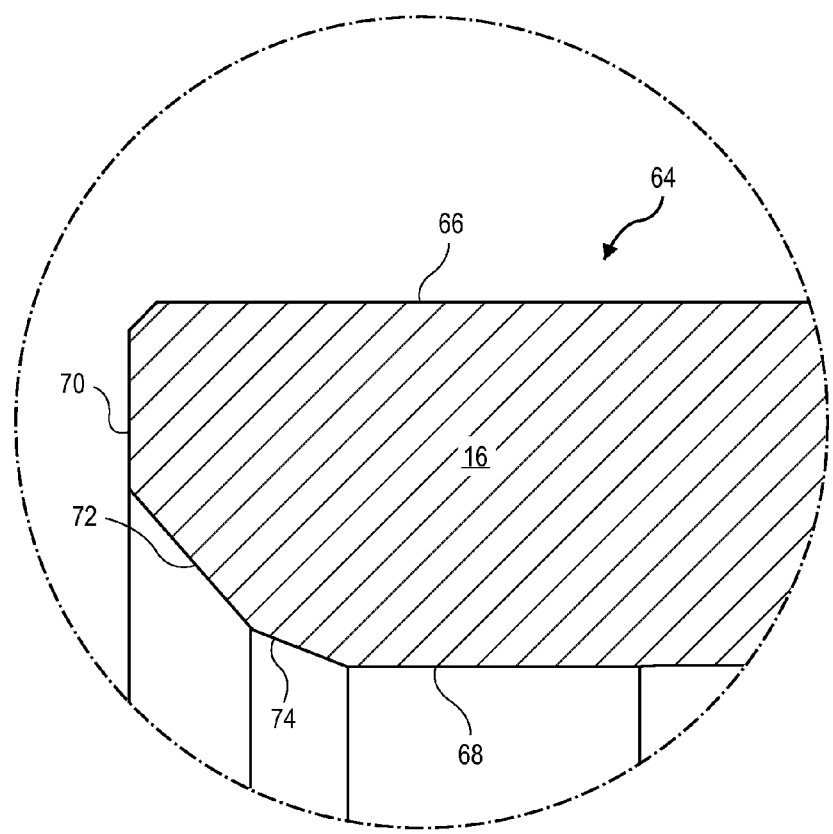
FIG. 7B is a detailed view of the retainer depicted in FIG. 7A.

FIG. 7B is a detailed view of the retainer second end 64, where the exterior and interior retainer walls 66, 68 respectively, are visible. The retainer second end 64 has a planar wall 70 and a first retainer sloped wall 72 and a second retainer sloped wall 74. The first retainer sloped wall 72 extends at an angle from the retainer planar wall 70 toward the second retainer sloped wall 74. The second retainer sloped wall 74 extends at an angle toward the retainer interior wall 68. The first and second retainer sloped walls 72, 74 respectively, and a portion of the retainer interior wall 68 mate against the plug 14 and in particular, against the second lip 46 of the plug 14.

Figure 8A:
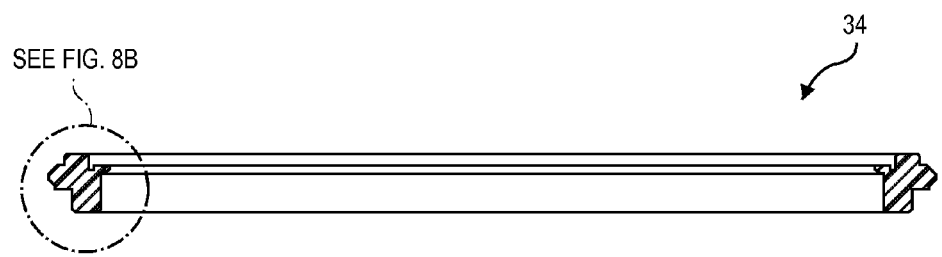
FIG. 8A is a cross sectional view of a plug seal of the surge relief valve of FIG. 1.
Figure 8B:
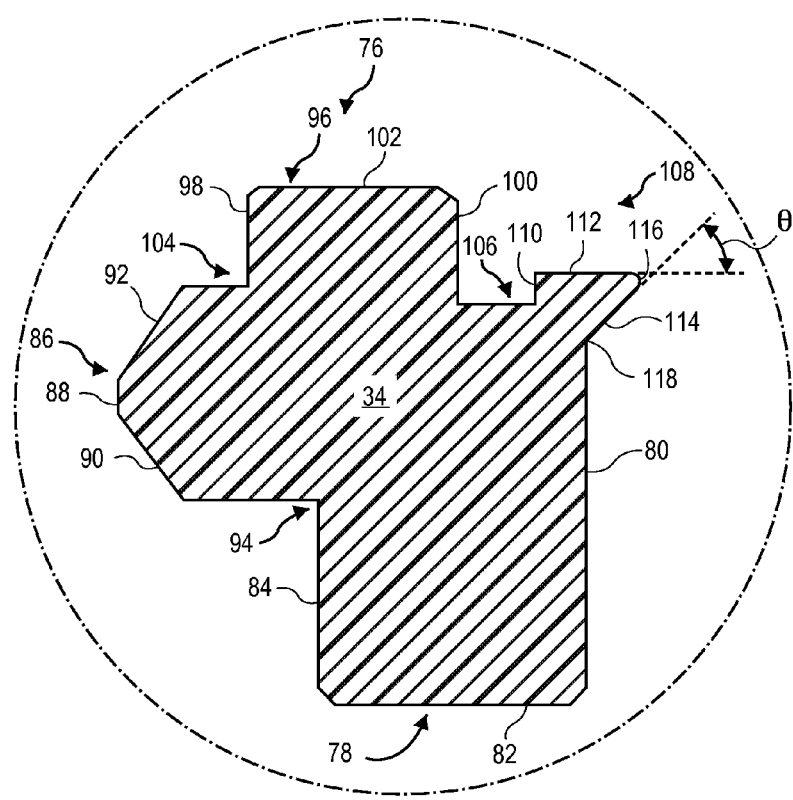
FIG. 8B is a detailed view of the plug seal depicted in FIG. 8A.

FIG. 8A is a cross sectional view of the plug seal 34, according to an embodiment of the present invention. The plug seal 34 also has an annular shape. FIG. 8B is a detailed cross sectional view of the plug seal 34. Generally, the plug seal 34 includes a first end 76 facing or oriented toward the direction of fluid flow and a second end 78, remote from the first end 76. Further, the plug seal 34 includes a first plug seal interior wall 80. Proceeding in a clockwise fashion around the structure, the plug seal 34 includes a plug seal second end wall 82 perpendicular to the plug seal interior wall 80. The plug seal 34 further includes plug seal exterior wall 84 remote from and parallel to the plug seal interior wall 80. A plug seal lip 86 protrudes from the plug seal exterior wall 84. The plug seal lip 86 includes a generally frusto-conical shape, having a planar surface 88 disposed between a first angled wall 90 and a second angled wall 92. The planar surface 88 of the plug seal lip 86 is parallel to the plug seal interior wall 80. A plug seal first seat 94 is defined by the junction of the plug seal exterior wall 84 and the plug seal lip 86.

The plug seal first end 76 includes a protrusion 96. The plug seal protrusion 96 includes a protrusion first wall 98 and a protrusion second wall 100 remote therefrom. The protrusion first and second walls 98, 100, respectively, are parallel to the plug seal interior wall 80. Disposed between the protrusion first and second walls 98, 100, is a plug seal first end wall 102 that is parallel to the plug seal second end wall 82. The plug seal 34 includes a plug seal second seat 104 formed at the junction of the plug seal lip 86 and the plug seal protrusion 96.

Further, the plug seal 34 first end 76 has a depression 106. The protrusion second wall 100 defines the depression 106 perpendicular to the protrusion second wall 100 and parallel to the plug seal second end wall 82. The plug seal first end 76 further includes a generally triangular bump 108. The bump has a first bump wall 110 parallel to the plug seal interior wall 80. The bump 108 further includes a bump second wall 112 perpendicular to the bump first wall 110 and a bump third wall 114 disposed at an angle toward the plug seal interior wall 80. At the junction of the bump second wall 112 and the bump third wall 114 is a rounded corner 116. The angle θ between bump second wall 112 and the bump third wall is about 40° to about 50°, and preferably about 45°. Lastly, a junction between the bump third wall 114 and the plug seal interior wall 80 defines a plug seal third seat 118.

There has thus been provided a detailed description of several components of a surge valve. In operation and with reference to FIG. 4, it can be seen that once the plug 14 is coupled to the valve 10 the plug seal 34 is coupled to the plug 14. The second plug seal wall 82 mates with the groove 30 of the plug 14. The plug seal bump 108 mates with the first lip 42 of the plug 14. The angle of the first slope 44 of the first lip 42 of the plug 14 is such that it accommodates the angle of the bump third wall 114 of the plug seal 34.

Further, the plug seal lip 86 rests against the second lip 46 of the plug 14 and abuts the retainer 16 at the retainer interior wall 68. The angles of the first and second angled walls 90, 92 respectively, form a small gap between the plug seal lip 86 and the retainer interior wall 68. When pressed tightly, the planar surface 88 of the plug seal 34 deforms and takes up the gap formed by the first and second angled walls 90, 92 allowing for a fluid tight seal. Further, this gap also prevents any shearing of the plug seal 34.

Next, the seal spacer 38 is placed against the plug seal 34 such that depression 58 of the seal spacer 38 mates with the plug seal first end protrusion 96 and the plug seal bump 108 contacts and abuts the second planar surface 56 of the seal spacer 38. Next, the seal retainer 40 is placed adjacent the seal spacer 38 such that the seal retainer 40 abuts and contacts against the first planar surface 54 of the seal spacer 38. Once the seal retainer bores 50 and the seal spacer bores 52 align with the counterbore 28 of the plug 14, the bolt 32 is slid through the bores 50, 52 and into the first connecting sink 28 to fasten the seal retainer 40 and the seal spacer 38 to the plug 14. In this fashion, the seal spacer 38 is captured and also retained in place. The generally staggered formation of the plug 14, the plug seal 34 and the seal spacer 38 combine to secure these components in a very tight manner to reduce or eliminate fluid leakage.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A seal for a surge relief valve, comprising:
  a) a valve housing having a flow inlet and a flow outlet;
  b) an annular retainer for coupling a plug to an interior of the valve housing, the retainer having a first end oriented toward the flow inlet and a second end remote therefrom, the retainer having a plurality of bores disposed periodically around the retainer passing from the first end through to the second end;
  c) the plug having a first end oriented toward the flow inlet and a second end remote therefrom, the plug having a mating junction for coupling with the second end of the retainer, the plug having a counterbore, a groove, a first lip defined between the counterbore and the groove and a second lip adjacent the groove, wherein the plug includes a plurality of threaded bores disposed periodically the counterbore to receive a corresponding plurality of threaded bolts, the threaded bores being in cooperative alignment with the bores disposed through the retainer, wherein the retainer is fastened to the plug via the plurality of threaded bolts extending through the corresponding plurality of bores in the retainer and mating with the corresponding threaded bores in the plug;
  d) an annular plug seal having a first end oriented toward the flow inlet and a second end remote from the first end for mating with the groove and a lip that abuts an outer retainer, wherein the plug seal further comprises a bump proximal to the first end and the bump having a top surface extending annularly inwardly and parallel to a plane of the plug seal and the bump having an angled surface extending radially outwardly from a tip of the bump towards the second end, the angled surface having an angle θ at an intersection of the top surface with the angled surface such that the angle θ is between about 40 and 50 degrees; and
  e) an annular groove disposed about the first end of the plug seal proximal to the bump.

2. The seal of claim 1, further comprising a seal spacer for mating with the plug seal, the seal spacer having an annular shape and a generally rectangular profile, comprising a top surface and a bottom surface remote from the top surface, the bottom surface having a depression formed therein for mating with a protrusion of the plug seal.

3. The seal of claim 2, wherein the seal spacer further includes an interior surface and an exterior surface and wherein the seal spacer comprises a bore disposed between the interior and exterior surfaces.

4. The seal of claim 1, wherein the plug seal lip further comprises a frusto-conical geometry having a first angled surface, a planar surface extending from the first angled surface, and a second angled surface extending from the planar surface, remote from the first angled surface.

5. The seal of claim 1, wherein the outer retainer further comprises an interior surface and an exterior surface remote from the interior surface, wherein the interior surface contacts the lip of the plug seal.

6. A seal for a valve, comprising:
  a) a plug seal having an annular shape and a generally rectangular profile, comprising a top surface, a bottom surface remote from the top surface, an interior side and an exterior side remote from the interior side, the top surface having a protrusion, the exterior side having a frusto-conical lip, and a bump defined by a junction of the top surface and the interior side, wherein the bump is proximal to the top surface and the bump extending annularly inwardly and parallel to a plane of the plug seal and the bump having an angled surface extending radially outwardly from a tip of the bump towards the second end, the angled surface having an angle θ at an intersection of the top surface with the angled surface such that the angle θ is between about 40 and 50 degrees, the plug seal further including an annular groove disposed about the top surface of the plug seal proximal to the bump; and
  b) a plug for mating with the plug seal, the plug comprising a first lip with a slope, a second lip and a depression defined between the first and second lips, wherein the slope of the first lip mates with the bump of the plug seal, the depression of the plug mates with the bottom surface of the plug seal and the second lip mates with the frusto-conical lip of the plug seal.

7. The seal of claim 6, further comprising a seal spacer for mating with the plug seal, the seal spacer having an annular shape and a generally rectangular profile, comprising a top surface and a bottom surface remote from the top surface, the bottom surface having a depression formed therein for mating with the protrusion of the plug seal.

8. The seal of claim 7, wherein the seal spacer further includes an interior surface and an exterior surface and wherein the seal spacer comprises a bore disposed between the interior and exterior surfaces.

9. The seal of claim 6, wherein the plug seal frusto-conical lip further comprises a first angled surface, a planar surface extending from the first angled surface, and a second angled surface extending from the planar surface, remote from the first angled surface.

10. The seal of claim 6, wherein the valve comprises an outer retainer having an annular shape, a first end and a second end remote from the first end, an interior surface and an exterior surface remote from the interior surface, wherein the interior surface contacts the frusto-conical lip of the plug seal.

11. A method for sealing a surge relief valve, comprising:
  a) providing a plug seal having an annular shape and a generally rectangular profile, comprising a top surface, a bottom surface remote from the top surface, an interior side and an exterior side remote from the interior side, the top surface having a protrusion, the exterior side having a frusto-conical lip and a bump defined by a junction of the top surface and the interior side, wherein the bump is proximal to the top surface and the bump extending annularly inwardly and parallel to a plane of the plug seal and the bump having an angled surface extending radially outwardly from a tip of the bump towards the second end, the angled surface having an angle θ at an intersection of the top surface with the angled surface such that the angle θ is between about 40 and 50 degrees, the plug seal further including an annular groove disposed about the top surface of the plug seal proximal to the bump;
  b) mating with the plug seal, a plug having a generally cylindrical shape, a first end and a second end remote from the first end, the plug first end comprising a first lip with a slope, a second lip and a depression defined between the first and second lips, wherein the slope of the first lip mates with the bump of the plug seal, the depression mates with the bottom surface of the plug seal and the second lip mates with the frusto-conical lip of the plug seal; and
  c) mating with the plug seal a seal spacer, the seal spacer having an annular shape and a generally rectangular profile, comprising a top surface, a bottom surface remote from the top surface, the bottom surface having a depression formed therein for mating with the protrusion of the plug seal, the seal spacer having an interior surface and an exterior surface remote from the interior surface.

12. The method of claim 11, wherein the valve further comprises an outer retainer having an annular shape, a first end and a second end remote from the first end, an interior surface and an exterior surface remote from the interior surface, wherein the interior surface contacts the frusto-conical lip of the plug seal.

* * * * *